(12) United States Patent
Shibayama

(10) Patent No.: US 6,256,644 B1
(45) Date of Patent: *Jul. 3, 2001

(54) CONTROL SYSTEM FOR STORING DATA IN ACCORDANCE WITH PREDEFINED CHARACTERISTICS THEREOF

(76) Inventor: Koichi Shibayama, 202 Soshia TM, 1096 Noborito, Tama-ku, Kawasaki-shi, Kanagawa-Pref. (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/085,109

(22) Filed: May 28, 1998

(30) Foreign Application Priority Data

May 29, 1997 (JP) .................................... 9-154347

(51) Int. Cl.⁷ .................................. G06F 12/02
(52) U.S. Cl. .............. 707/205; 707/1; 711/136; 711/160; 711/209
(58) Field of Search .................. 707/1, 2, 100, 707/205; 711/133, 136, 154, 158, 159, 160, 167, 202, 209; 710/25, 74

(56) References Cited

U.S. PATENT DOCUMENTS

| | | | |
|---|---|---|---|
| 5,765,204 | * 6/1998 | Bakke et al. | 711/202 |
| 5,893,139 | * 4/1999 | Kamiyama | 711/117 |
| 5,983,318 | * 11/1999 | Willson et al. | 711/113 |
| 6,122,685 | * 9/2000 | Bachmat | 710/74 |
| 6,128,717 | * 10/2000 | Harrison et al. | 711/202 |

* cited by examiner

Primary Examiner—Jean R. Homere
(74) Attorney, Agent, or Firm—Dennison, Scheiner, Schultz & Wakeman

(57) ABSTRACT

A system is provided for controlling storing databases in nonvolatile storages by a program. The database is composed as a set of records. In the system, a record storing reference table and data storing areas are provided. There is provided in the reference table, record identification data for identifying records and storage area designation data for designating a storage area in the nonvolatile storages. The data storing area is provided in one of the nonvolatile storages for each record. In the area, a storing logic record is stored. A storing control means is provided for newly storing a record in a storage area designated by the storage area designation data in the record storing reference table. A storing address information of the record in the storage area is stored in one of the data storing areas. A record stored in a storage area is read in based on the address information.

7 Claims, 15 Drawing Sheets

| REF TABLE 11 | |
|---|---|
| RECORD IDENTIFICATION DATA | STORAGE AREA DESIGNATION DATA |
| A1 | 22b |
| A2 | 22c |
| B1 | 22b |
| B2 | 22a |
| C1 | 22b |

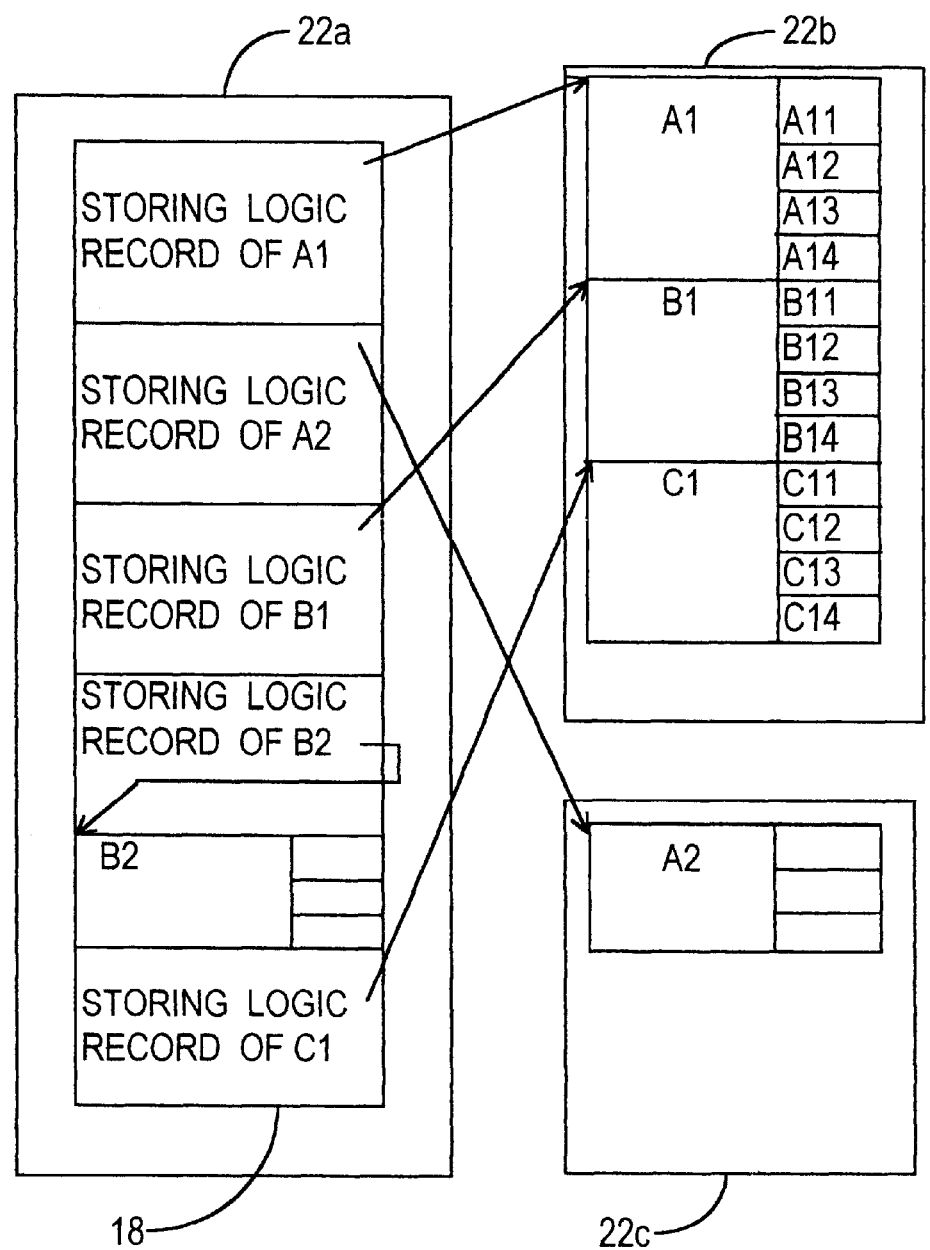

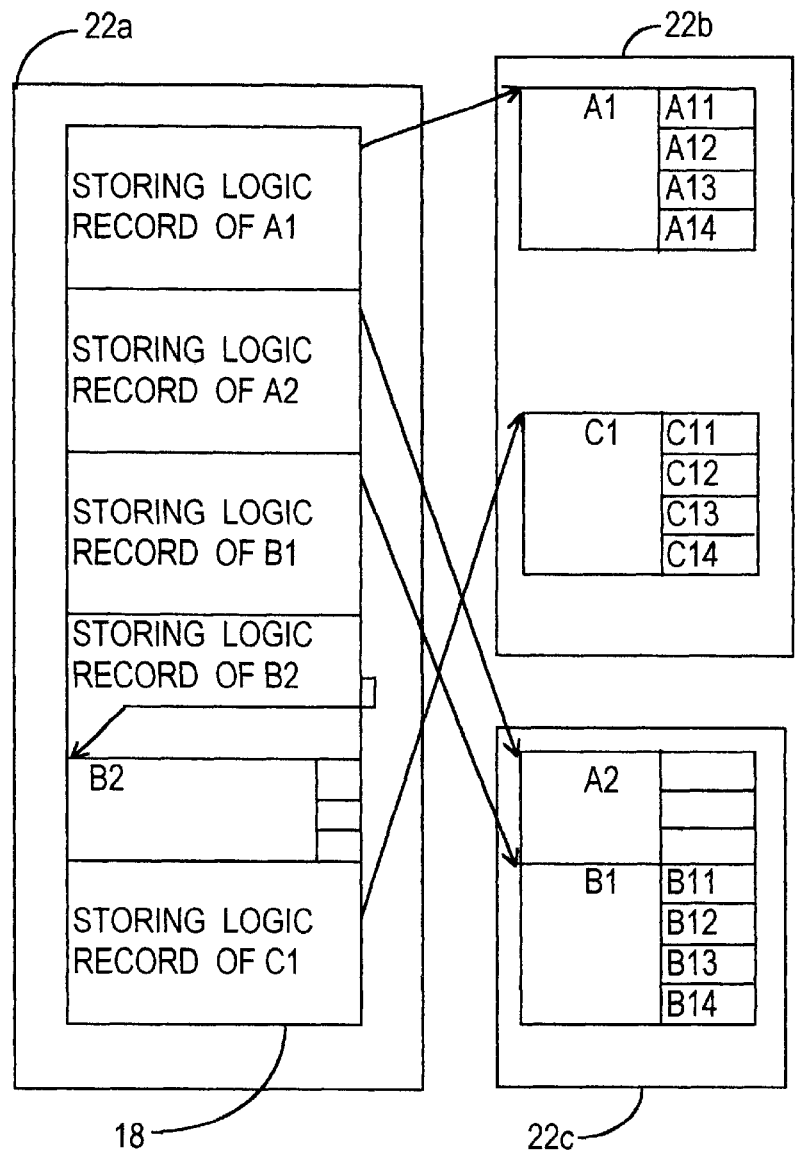

| DATA ITEM NAME | RELATIVE ADDRESS | DATA ITEM LENGTH | IDENTIFICATION DATA | STORAGE AREA NAME |
|---|---|---|---|---|
| A11 | 0 | 2 | 1 | 22b |
| A12 | 2 | 3 | 2 | 22a |
| A13 | 5 | 4 | 3 | 22b |
| A14 | 9 | 5 | 4 | 22c |

27

| STORAGE AREA NAME | ACCESS ORDER |
|---|---|
| 22a | 1 |
| 22b | 2 |
| 22c | 3 |

28

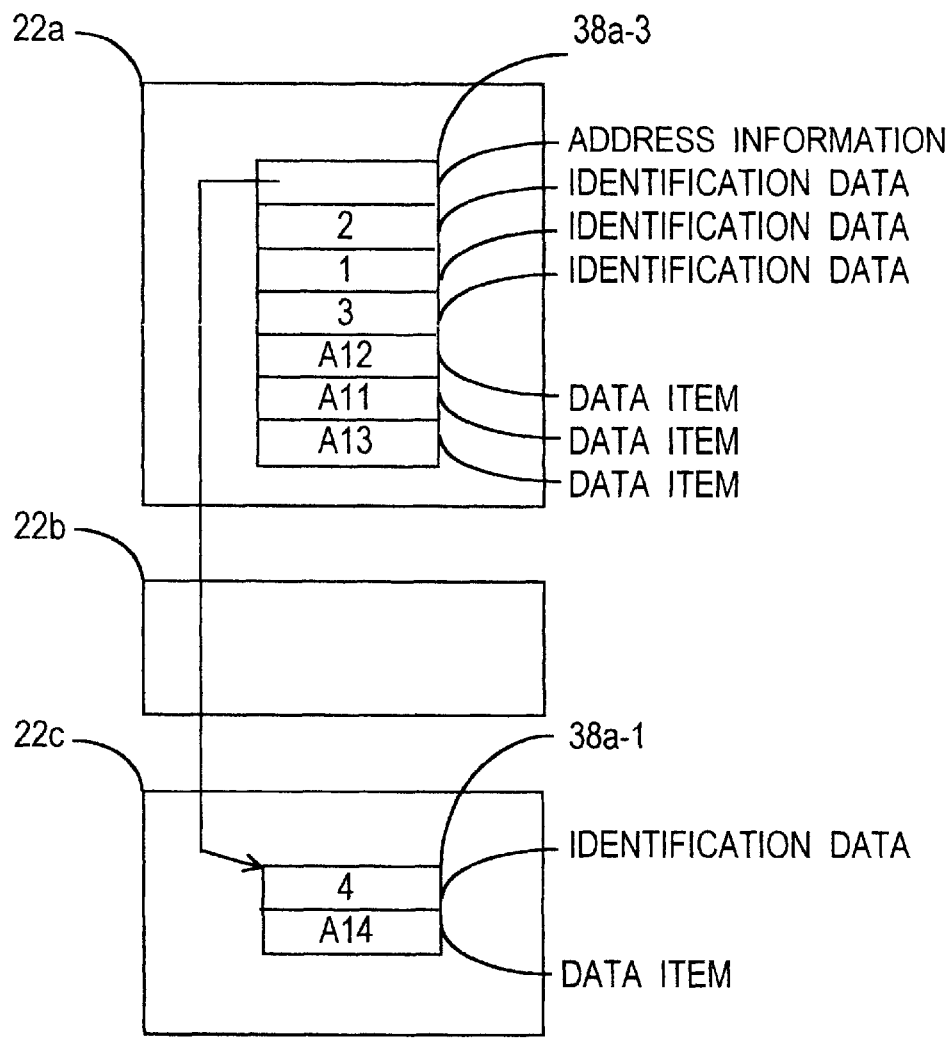

CONTROL SYSTEM FOR STORING DATA IN ACCORDANCE WITH PREDEFINED CHARACTERISTICS THEREOF

BACKGROUND OF THE INVENTION

The present invention relates to a system for controlling the storing of data in a storage of an electronic computer system, and more particularly to a data storing control system in which data are stored and read in by a program.

In a system for storing files blocks and databases in a storage for example in a nonvolatile storage such as a magnetic disk, each of the files blocks and the databases is composed as a set of records, and the record is composed as a set of data items. The program requires inputs and outputs in units of record. Input and output processes between the magnetic disk and a main memory device are performed in units of page or block (hereinafter called page) as a set of records.

FIG. 19 shows a conventional network database (NDBA). The database is composed as a set of a record A1, record A2, record B1, record B2, and record C1. The record A1 is a set of data items of A11, A12, A13 and A14, the record B1 is a set of data items of B11, B12, B13 and B14, and record C1 is a set of data items of C11, C12, C13 and C14. Each of the records A1, B1 and C1 is an owner record of indexed sequential organization. Each of the records A2 and B2 is designated as a via set of each of the records A1 and B1. Therefore, the records A1, A2, B1, B2 and C1 are stored in a storage area 21b of the magnetic disk of the FIG. 20 in the arrangement shown in the figure. The program requests input and output in units of record (A1, A2, B1, B2, C1). However, between the storage area 21b and the main memory device, the input and output are carried out in units of page (page 1, page 2, page 3).

In order that the program obtains a desired record in a file or database, it is necessary to decide a head address information of the record wherein the record is stored. It is necessary that the program can exactly read all records even if the number of records changes. Therefore, the storing position of the record is decided by using a positioning logic which is commonly applied to respective records in files or databases. For example, in a sequential organization file, such a positioning logic that a leading position of a record is decided by an address which is obtained by adding the length of the last record to the leading address of the last record.

As another positioning logic, there is provided a logic for a direct organization. The logic is composed in such that a desired record is stored in a page which is decided by hashing a key information for identifying the desired record. In the case that a plurality of records are stored in a page decided by the hashing, the records are detected by using the key information so as to identify the desired record. The key information for deciding a desired record from a plurality of records stored in the same page which is decided by the positioning logic is hereinafter called record identifying information.

In the case that a program uses a data item in a record, the record is read in a predetermined position of a main memory, such as an input buffer or a user working area. The record has a fixed structure in which respective data items are arranged in a predetermined order based on a physical continuity, and the relative address from the head of the record is decided for the data item. Therefore, the head position of the data item is decided by using the relative address from the head of the read in record.

Meanwhile, in the electronic computer system, the shortening of the access time to data stored in an above described storage causes the process time to shorten. The fact that the process time is shortened has important value for the industry in aspects such as the improvement of process efficiency, improvement of productivity, and others.

A first example of a conventional method for shortening the access time will be described hereinafter. Assuming that data necessary for a program are records A1, B1 and C1 at the database (NDBA) having a structure shown in FIG. 19, and that the database (NDBA) has a storing structure of FIG. 20, it is necessary to read three pages of "page 1", "page 2" and "page 3" in storage area 21b.

On the assumption that, as shown in FIG. 21, there are two storage areas 21b and 21c, and the records A1 and B1 are stored in the page 1 of the storage area 21b, and the record C1 is stored in the page 2 of the storage area 21b, and that the remaining records are stored in a storage area 21c, and that the page storing a desired record is already read and stored in the main memory, it is not necessary to read again, the page from the storage area. (This operation is, for example, described in the Japanese Patent Application Publication 7-89334). Therefore, two pages of page 1 and page 2 are read from the storage area 21b. As a result, the average access time for the records A1, B1 and C1 is shortened to $2/3$.

There is a case that, in the database NDBA of FIG. 19, a program requires three data comprising A11 in the record A1, B11 in the record B1 and C11 in the record C1. In the case that the database NDBA has the storing structure of FIG. 20, it is necessary to input three pages comprising the page 1 including the data item A11, page 2 including data item B11 and page 3 including data item C11. If there are two storage areas 21b and 21c as shown in FIG. 22, and data items A11, B11 and C11 are stored in the page 1 of the storage area 21b, remaining data items are stored in the storage area 21c, the average access time for the data items A11, B11 and C11 is to read only page 1 of the storage area 21b, thereby being shortened to $1/3$.

The effect on the shortening of the average access time dependent on the adjacent location of records or data items is hereinafter called adjacent location effect. The combination of the records A1 and B1 has a higher adjacent location effect than the combination of records A1 and A2. The combination of data items A11 and B11 has a higher adjacent location effect than the combination of data items B11 and B12. The aggregating of data of high adjacent location effect is hereinafter called adjacent concentration. As an example of the using the adjacent concentration in the record units, there is the via set specification for a member record of the network database. It is possible to obtain the adjacent concentration effect by specification to a database schema. There is no technique capable of adjacently aggregating data in the units of data item.

As a second method of shortening the access time, the disk cache is used. This method, in the case of using a record on a magnetic disk, is to locate a copy of a page including the record on the disk cache which is an upper storage hierarchy. After the location, the record can be used at the speed of the access time of the disk cache.

A third method for shortening the access time is to move a file or database to a memory of a faster storage hierarchy when the file or database is used in units of the file or database. For example, when a file which is ordinarily located on the magnetic disk is used, the file is moved to an electronic disk. Japanese Patent Laid Open 6-44108 discloses an example of the third method.

Above described second and third access time shortening methods use the storage hierarchy. In the use of the storage hierarchy, the access time can be shortened by locating data having a high probability of use on a higher storage hierarchy. Since the memory capacity decreases as the storage hierarchy becomes higher, it is important to locate the data on the storage hierarchy in accordance with the probability of use of the data for the shortening of the access time.

It is possible to grasp the adjacent location effect in units of the records or data items and the probability of use, by analyzing the internal structure of the program used for the data or by statistically analyzing the past history of action of the data.

In accordance with the above described first method for shortening the access time, although the access time is shortened in all records and data items dependent on the adjacent concentration, the effect is limited to the member record of the network database. In addition, since a schema must be designated in the design stage, an adjacent concentration of an only one fixed pattern for all clusters is implemented. In other words, the first problem of the first method for shortening the access time is that the adjacent concentration can not be implemented in arbitrary record units or in arbitrary data item units.

In the second method, the first access to a page including a desired record to be used must be performed on the magnetic disk. Therefore, the access time shortening effects on only the access to the same page after the first access. Consequently, the page including data to be used can not previously be located on a memory of an upper storage hierarchy. Namely, the storage hierarchy can not effectively be utilized.

In accordance with the third method, although data can be located on an upper storage hierarchy in advance, the location is performed in the file or database units. As a result, even if only a part of data, for example 20% of a file, is used by a program, an upper hierarchy must have a capacity capable of storing 100% of the file. In addition, the upper storage hierarchy is wastefully occupied by 80% of unused data.

The second problem common to the second and third methods for shortening the access time is that the file or the database can not "previously and partially" be located in an upper hierarchy, and hence the access time shortening can not be more effectively implemented.

The reason for the above described first and second problems is that data can not be stored in an a desirable designated storage area in the record or data item units. The reason why data can not be stored in an a desirable designated storage area in the record units is that the position where the record is stored is decided by the positioning logic. On the other hand, the reason why data can not be stored in an a desirable designated storage area in the data item units is that the physical continuity between data items in a record is a precondition.

SUMMARY OF THE INVENTION

An object of the present invention is to provide a system for controlling the storing of data in a memory wherein data can be stored in an a desirable designated storage area in units of a record or a data item, whereby access time can be shortened.

According to the present invention there is provided a system for controlling storing and reading a record, comprising, a plurality of first storage areas, a record storing reference table having a record identification data storing area for identifying records and a storage area designation data storing area in which a storage area proper for a record to be newly stored is designated in accordance with characteristics of the record, a second storage area for storing a storing-logic-record, storing control means for newly storing a record in one of the first storage areas designated by the record storing reference table, and for obtaining address information of the stored record, and for writing the address information in the second storage area as a storing-logic-record, reading control means for reading a record stored in one of the first storage areas in accordance with the address information stored in the second storage area.

These and other objects and features of the present invention will become more apparent from the following detailed description with reference to the accompanying drawings.

BRIEF DESCRIPTION OF DRAWINGS

FIG. 4 shows a storing state when a network database is stored in the storage areas based on the record storing reference table of FIG. 2;

FIG. 5 shows a storing state after a relocation;

FIG. 6 shows an example of a record relocation reference table;

FIG. 17 shows a storing state after relocation;

FIG. 18 shows an example of an item group record relocation reference table;

DETAILED DESCRIPTION OF THE PREFERRED EMBODIMENT

Figure 1:
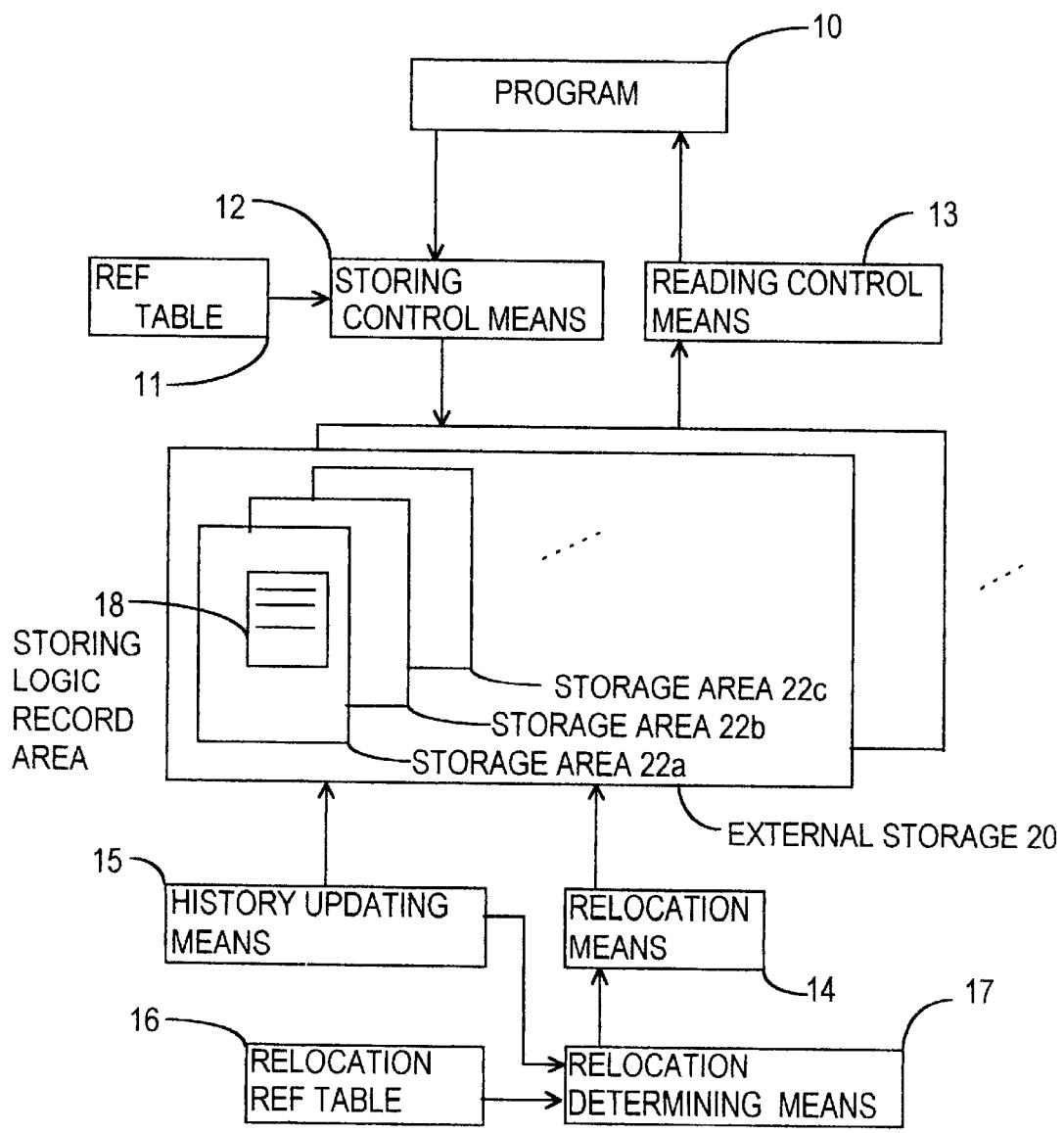
FIG. 1 is a block diagram of a data storing control system of the present invention.

The first embodiment of the present invention will be described hereinafter with reference to FIG. 1 showing a block diagram of a data storing control system of the present invention. The control system is constructed on an electronic computer system. The control system comprises a program 10 for creating data and using the created data, an external nonvolatile storage 20 such as a magnetic disk for storing records, a record storing reference table 11 for designating a storage area of the external storage in which records are newly stored, a storing control means 12 for controlling the storing of the record based on the program and record storing reference table 11, a reading control means 13 for controlling the reading of data from the external storage 20, a record relocation means 14 for changing a storage area (relocation of record) in which a record is stored, and for storing the record in the external storage 20, a record use history updating means 15 for updating the history of the use of the record, a relocation reference table 16 holding references for the relocation of the record, a record relocation determining means 17 for determining the necessity of the relocation of the record based on outputs of the history updating means 15 and the relocation reference table 16, and a storing logic-record area 18 in the storage area 22a for storing address information as the storing logic-record.

Each of the reference tables 11 and 16 is stored in an internal memory of the electronic computer in a form of a table. The history of the using of record is stored in the storing logic-record area 18 which represents the using history of the record.

The external storage 20 has three storage areas 22a, 22b, and 22c. The program 10 recognizes the storage area 22a as a storage area for storing the record.

The storage area 22b is provided for storing records, each having a high use frequency and the storing area 22c is provided for storing records each having a lower level frequency.

Figures 2, 3:
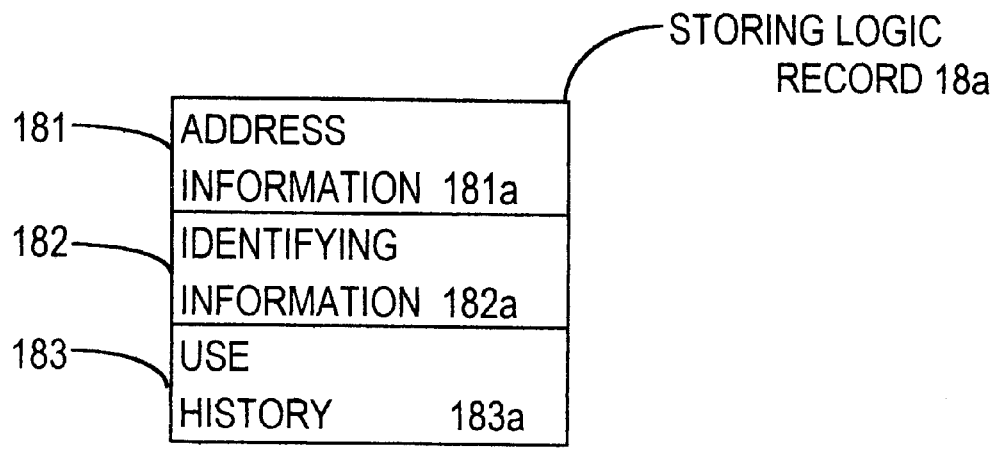
FIG. 2 shows a record storing reference table.
FIG. 3 shows a composition example of a storing logic-record to be stored in the storing logic record storing area.

FIG. 2 shows an example of composition of the record storing reference table 11. In the reference table, record identification data and storage area designation data for designating a storage area for each record are provided.

FIG. 3 shows a composition example of the storing logic record 18a to be stored in the storing logic record storing area 18 comprising record areas 181, 182 and 183. The storing logic-record 18a comprises record address information 181a, record identifying information 182a and record use history 183a, and the storing logic-record 18a is provided for each record.

The operation of the data storing control system of the present invention will be described hereinafter with reference to FIGS. 1 to 3. When the program 10 requires the new recording of a record, for example a record A1, having a high use frequency the storing control means 12 decides the storage area 22b for storing the record A1 based on the record identification data by referring to the record storing reference table 11 shown in FIG. 2, and writes the record A1 in the storage area 22b. For the writing, definition of file is preliminary decided in the storage area units, and the record is written by the sequential organization system. The storing control means 12 obtains the address information of the stored record A1 to an address information 181a in a storing-logic-record 18a. The storing control means 12 further writes the address information 181a in the area 181 for the record A1 in the storage area 22a by a positioning logic of the program 10. The storing control means 12 further writes the storing-logic-record 18a in the storage area 22a by a positioning logic of the program 10. In the case that the positioning logic needs the length of the record, the length of the storing-logic-record 18a is used. The capacity of an area in the storage area 22a for storing the storing-logic-record is decided by the length of the storing-logic-record.

In the case that there is record identifying information, the information is included in the storing logic record, and stored together with the storing logic record 18a. When a storage area of a record is designated at the same storage area in which an own storing-logic-record should be stored (in the first embodiment, the storage area is area 22a, as shown by B2 in FIG. 4), the record may be combined with the own storing-logic-record and stored.

In the case that a record is rewritten to a storage area, the record and the storing logic record are stored at the original address at the reading. When a stored record is read, the reading control means 13 reads the storing-logic-record 18a in the storage area 22a by a positioning logic of the program 10, and further gets the address information 181a of the stored record, and reads the stored record based on the address information.

Figure 19:
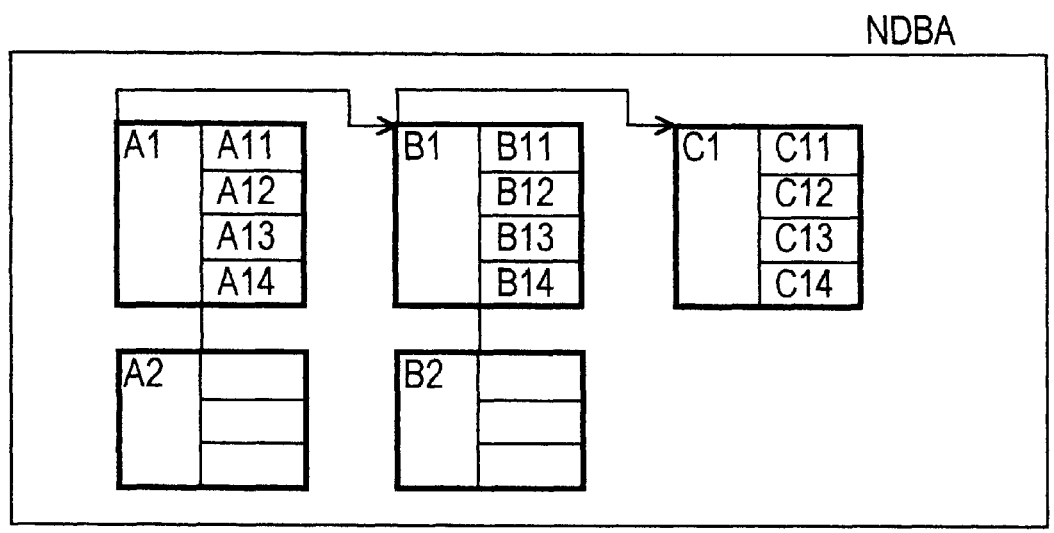
FIG. 19 shows a conventional network database.
Figure 20:
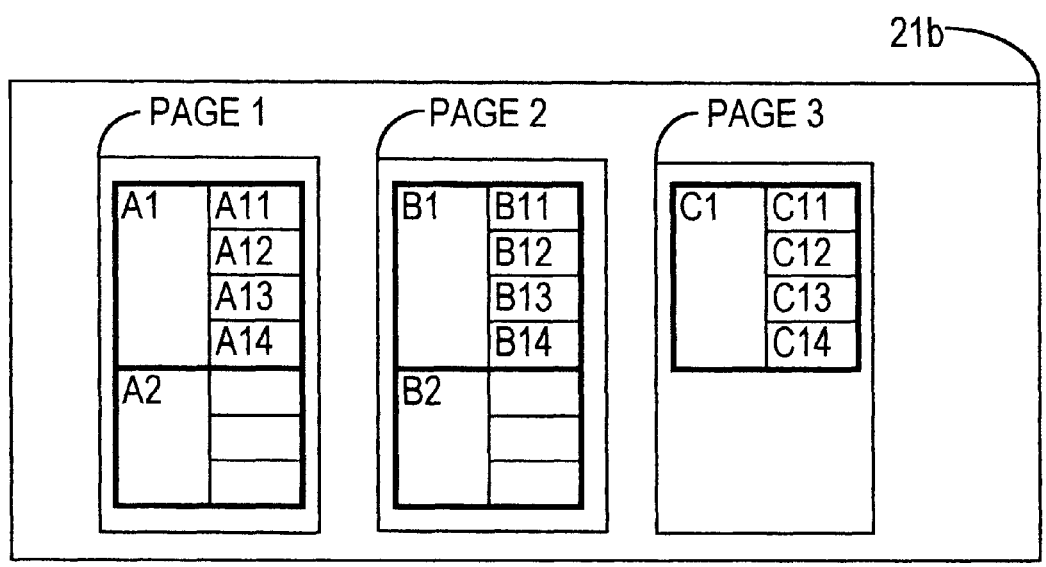
FIG. 20 shows the database stored in a storage area.
Figure 21:
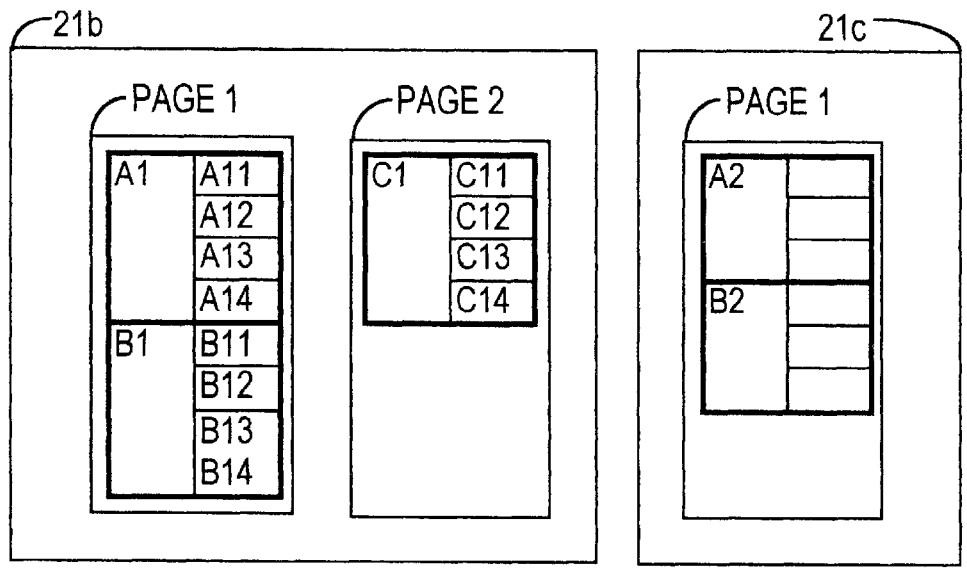
FIG. 21 shows three desired records are stored in two pages.
Figure 22:
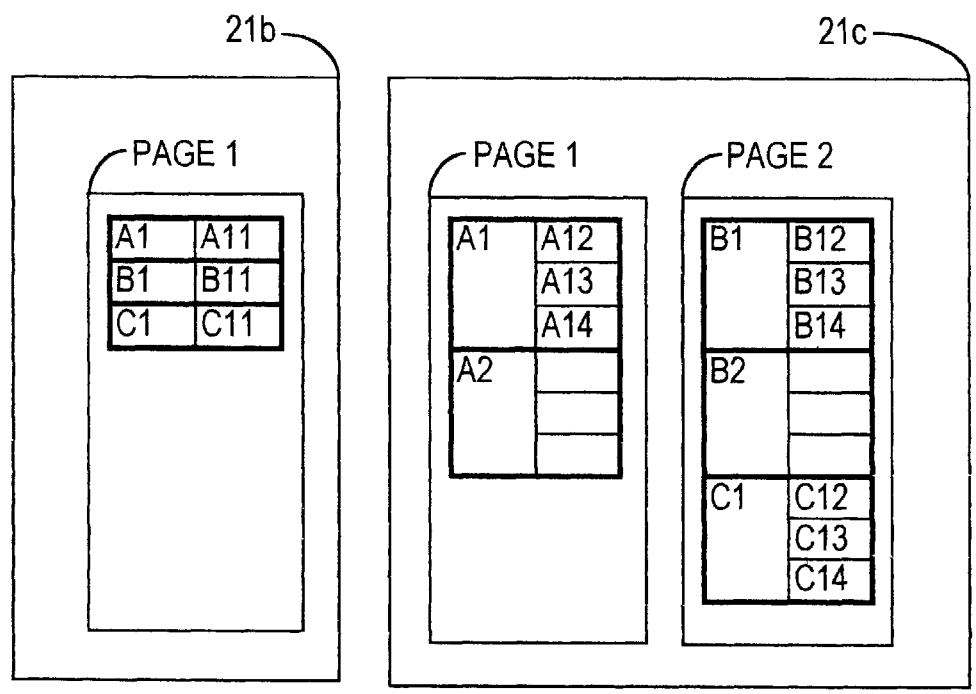
FIG. 22 shows three desired items are stored one page.

FIG. 4 shows a storing state when the network database of FIG. 19 is stored in the storage areas 22a, 22b and 22c based on the record storing reference table of FIG. 2.

When the all records A1, B1, C1 of FIG. 4 stored in the storage area 22b are necessary, the records may directly be read in sequence. In this case, it is not necessary to read the storing logic record including the address information of the record thereby shortening the access time.

The operation for relocating a record to a storage area different from the previous storage area is hereinafter described, about the case to relocate the record B1 from the storage area 22b to the storage area 22c. The relocation means 14 reads the record B1 from the storage area 22b and writes the record B1 in the storage area 22c. The relocation means 14 obtains the address information of the record B1 in the storage area 22c, and stores it in the address information area 181 of the storing logic record 18a for the record B1.

FIG. 5 shows a storing state after the relocation. Namely, the records A1 and C1 are located in the storage area 22b, and the records A2 and B1 are located in the storage area 22c. Thus, in accordance with the present invention, the record can be stored in a desirable designated storage area.

FIG. 6 shows an example of the record relocation reference table 16. The reference table 16 provides identification data 16a for the records, an upper limit 16b of the number of access times to the storing logic record 18a in one day, and designation 16c of the storage area.

Operation for automatically relocating a record is described hereinafter. In the system, the storage area 22b stores a record having a higher frequency in use of the record. In the record use history area 183 of the storing-logic record area 18, the number of access time accessing each storing logic record 18a in one day (frequency in-use of the storing logic record in one day) is held as the record use history 183a. More specifically, the record use history updating means 15 adds 1 to the number of access times in one day in the record use history area 183 at every using of the storing logic record 18a in the area 18, thereby rewriting the record use history 183a. Furthermore, the record use history updating means 15 informs the record relocation determining means 17 about the number of access times. The record relocation determining means 17 compares the number of access times in one day with the upper limit 16b of the number of access times in one day. When the number of access times of one of the records in the storage area 22c, for example the record A2, exceeds the upper limit 16b, the record relocation determining means 17 instructs the record relocation means 14 to relocate the record. Thus, the record (A2) in the storage area 22c is relocated in the storage area 22b. Accordingly, in the storage area 22b, only records each having a high frequency in use in one day are stored. For example, in case of the bank account, the number of records of high frequency in use of the record, is very small. Therefore, since the small number of records are stored in the storage area 22b, the access time to the desired record can largely be shortened. In other words, the access time is shortened by locating the data on the storage hierarchy in accordance with the probability of use of the data.

As a memory satisfactory for storing above described data, for example, there is "MEMOREX TELEX 6990" (semiconductor disk) having access time of 0.1 msec, and "IBM 3390-1" (magnetic disk) having access time of 16.6 msec. For a file in which all records are stored in a magnetic disk having the same access time as the above described magnetic disk, the inventor of the present invention conducted the following experiment.

All storing logic records and the records were stored in the magnetic disk, and two sets of records were adjacently concentrated in a storage area. Following results of average access times were obtained.

Conventional system: (16.6×2)/2=16.6 msec.

Present invention system: (0.1×2 +16.6)/2=8.4 msec.

In accordance with the present invention, the access time is reduced to about ½.

If the length of the record is 500 byte, and the length of the storing logic record is 20 byte, the weighted average access time in the capacities of the above described two disks is as follows. (0.1×20+16.6×500)/(20+500)=16.0 msec This demonstrates that the present invention has a higher effect on the shortening of the access time than the effect by speeding up of component in hardware. The number α of records stored in a storage area is follows. (0.1×α+16.6)/α<16.0

The inventor further conducted the following experiments.

Storing logic records and 10% in capacity and 20% in use probability record of the records were stored in the above described electronic disk, 90% in capacity and 80% in use probability record was stored in the magnetic disk. The access time was shortened by the present invention as following results.

Conventional system: 16.6 msec.

Present invention system: 0.1×0.2+(0.1+16.6) ×0.8=13.4 msec

Figure 7:
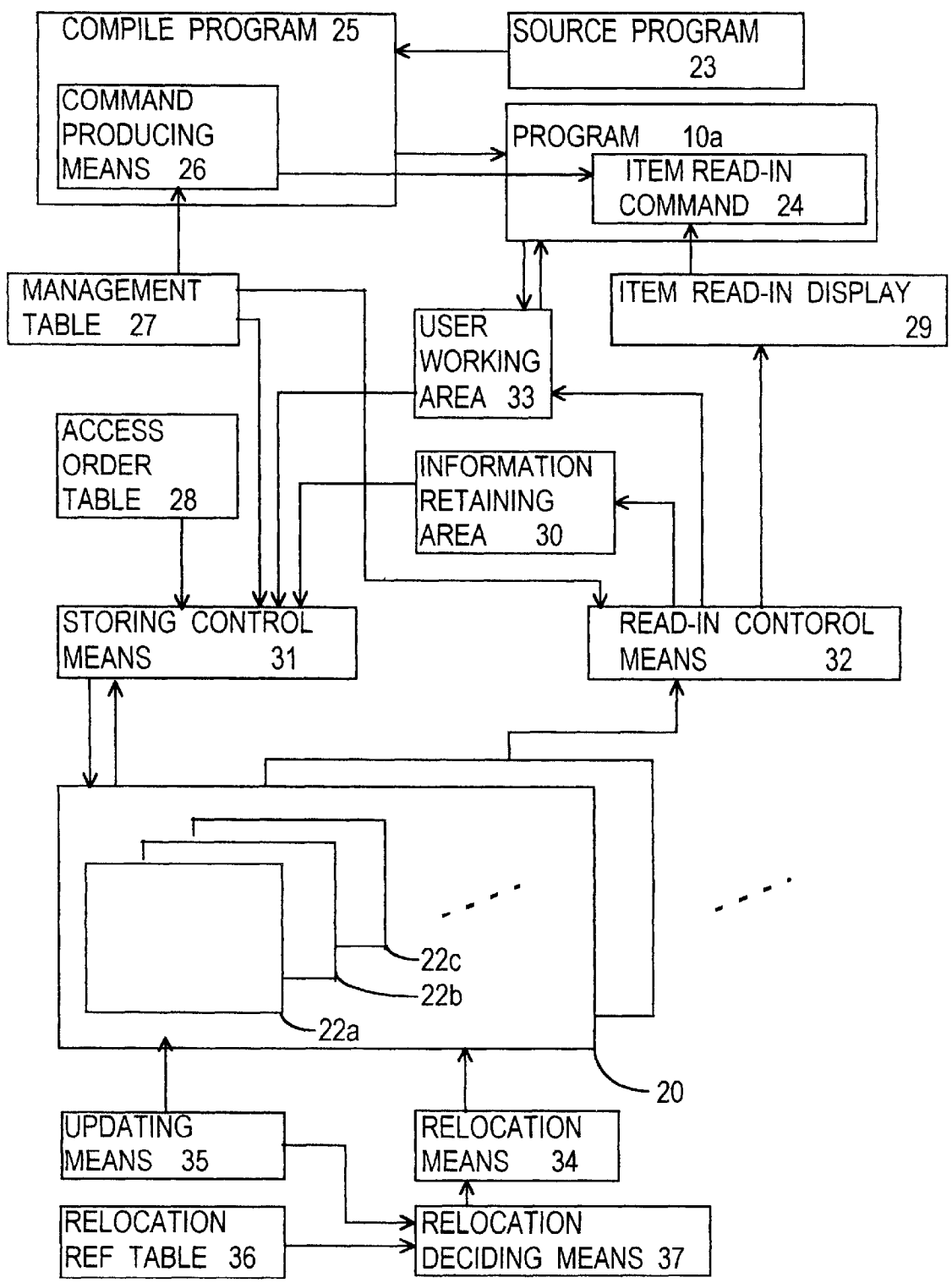
FIG. 7 is a block diagram showing a data storing control system of a second embodiment of the present invention.

The weighted average access time is as follows. (0.1× (20+500×0.1)+16.6×(500×0.9))/ (20+500)=14.4 msec FIG. 7 is a block diagram showing the data storing control system of the second embodiment of the present invention.

The control system comprises a program 10a having an item read-in command 24, a source program 23 for the program 10a, a compile program 25 having an item read-in command producing means 26, an data item storing management table 27, a storage area access order table 28, an item read-in display 29, a control information retaining area 30, an item group record storing control means 31, a user working area 33 in a main memory (not shown), an item group record read-in control means 32, an item group record relocation means 34, an item group record using history updating means 35, an item group record relocation reference table 36, and an item group record relocation deciding means 37.

The item group record using history is one of components of the item group record controlling information, and represents the using history of each item group record composing an aggregation of item group records in the highest order item group record.

The item read-in command 24 commands the item group record read-in control means 32 to read a desired data item in the main memory from the external storage 20 based on an item identification data for storing thereof included in the item read-in command. The external storage 20 is divided into three storage areas 22a, 22b, and 22c similarly to the first embodiment. The program 10a recognizes the storage area 22a as a storage area for storing files and databases.

Figures 8, 9, 10:
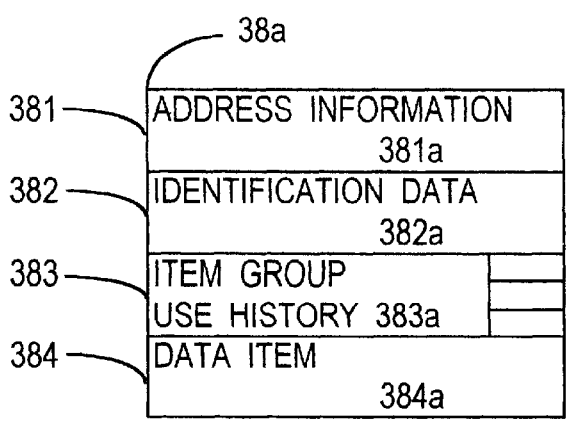
FIG. 8 shows an data item storing management table.
FIG. 9 shows a storage area access order table.
FIG. 10 shows an example of an item group record.

FIG. 8 shows an example of composition of the data item storing management table 27. The table 27 is arranged in the data item units, and comprises the data item name, relative address from a leading address, length of the data item, identification data for storing the data item, and storage area name. The identification data is represented by a natural number in the present embodiment.

Figure 15:
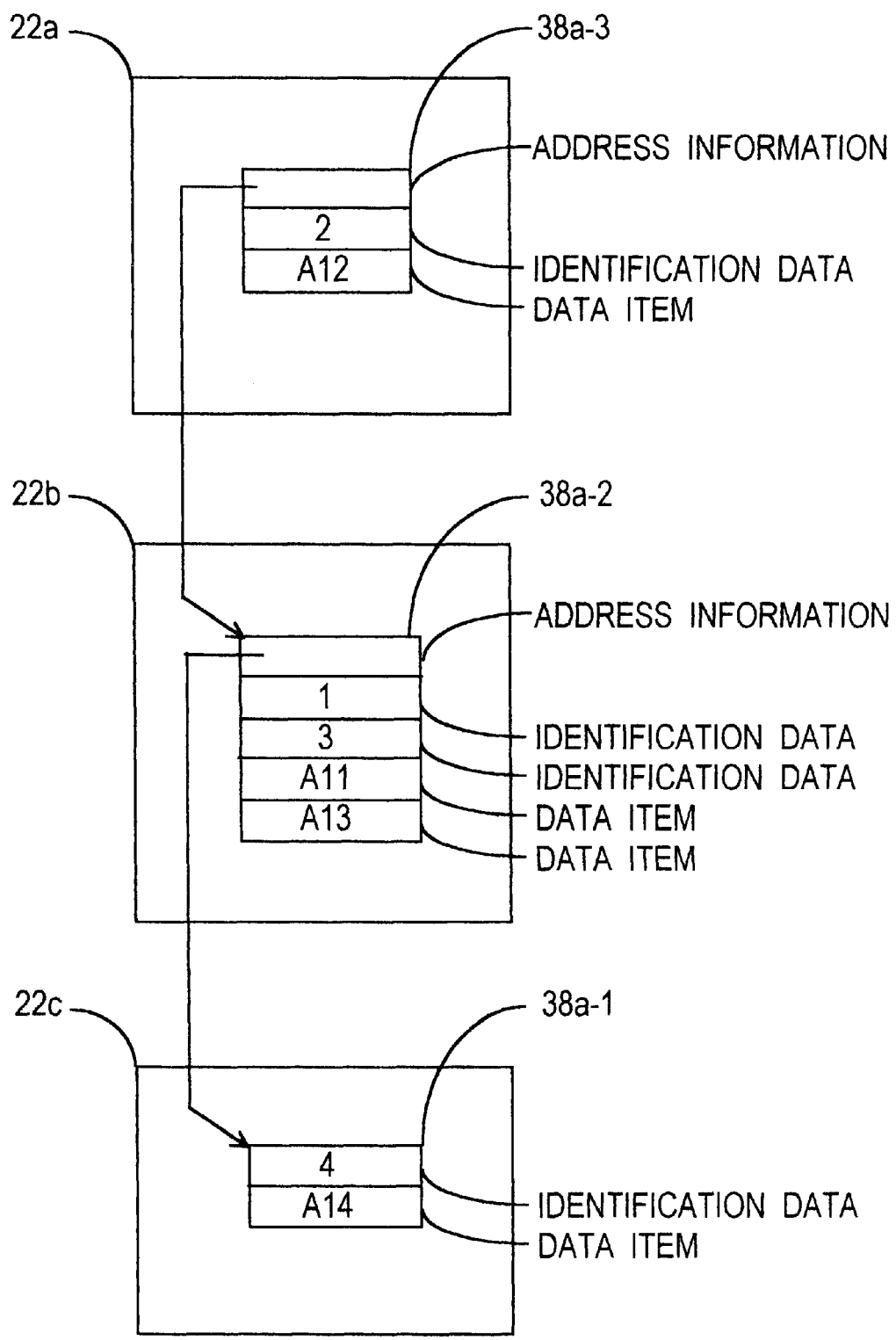
FIG. 15 shows a state of data items stored in storage areas.

FIG. 9 shows the storage area access order table 28. The table is arranged in the storage area units, and comprises the storage area name, and access order. The storage area 22a is provided for storing item group records, each having a high use frequency. As to the access order, the storage area at the front precedence is called high order hereinafter, and the storage area at the behind precedence is called low order. The highest item group record is called the highest order, and the lowest item group record is called the lowest order. Furthermore, the lowest order item group record in the high order item group record is called immediately upper order record for a beneath item group record, and the highest order item group record in the low order item group record is called immediately lower order for an over record. For example, an item group record 38a-3 in FIG. 15 is the immediately upper order record for an item group record 38a-2, and the item group record 38a-2 is the immediately lower order record for the item group record 38a-3.

The storage area 22a is necessarily provided even if no data item to be stored in the storage area is provided. The access order of the storage area 22a is the highest order. In the case that there is a plurality of kinds of record in the file or database which are different in layout, the data item storing management table 27 and the storage area access order table 28 are provided by the number of the kinds of records.

FIG. 10 shows an example of an item group record 38a. The item group record 38a is provided for each item group record. Namely, the item group record 38a is a unit for approaching a desired item group record comprising data items stored in the same storage area in order to store individually a data item in the record in an arbitrary storage area. An item group area 38 comprises an area 381 for address information 381a of an immediately lower order item group record for the own item group record, area 382 for identification data 382a for storing items, area 383 for item group use history 383a, and area 384 for data item 384a. The aggregation of the address information 381a, item identification data 382a, and use history 383a is called item group record control information hereinafter. The immediately lower order item group address information 381a represents the position where an immediately lower item group record is stored. Therefore, the address information is written when the immediately lower order item group record is stored. Consequently, the address information does not exist in the lowest order item group record. The identification data 382a represents a data item included in the item group record. The order of the arrangement of the identification data is the same as the arrangement order of the corresponding data items. The item group use history 383a represents the use history of item group record.

The item read-in display 29 is provided for displaying that a data item of a record is already read in the user working area 33.

Figure 11:
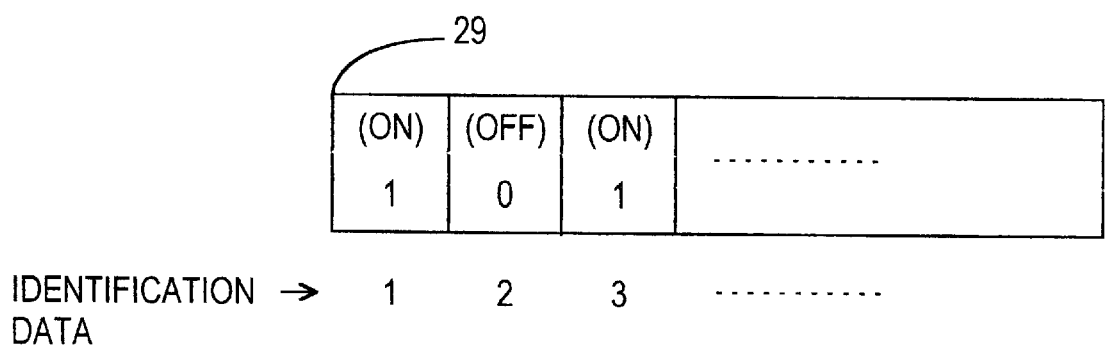
FIG. 11 shows an example of display of an item read-in display.

FIG. 11 shows an example of display of the item read-in display 29. In the drawing, the numeral "1" (ON) for the item identification data "1" and "3" means that the items are already read in a storage area, and the numeral "0" (OFF) for the item identification data "2" means that the item is not yet read.

Operation about an item group record comprising data items A11, A12, A13 and A14 will be described hereinafter. When the program 10a commands the system to newly store the record, the item group record storing control means 31 recognizes that the lower most access order is the storage area 22c from the storage area access order table 28 of FIG. 9, and that the data item to be stored in the storage area 22c is the data item A14 from the data item storing management table 27 of FIG. 8.

The item group record storing control means 31 gets the data item A14 from the user working area 33, and gets the identification data "4" from the item storing management table 27. Thus, as shown in FIG. 15, an item group record 38a-1 is composed and written in the storage area 22c, and the address of the item group record 38a-1 in the storage area 22C is obtained. The writing is carried out by the sequential organization system.

Then, the item group record storing control means 31 recognizes that the next access order is the storage area 22b from the storage area access order table 28, and that the data item to be stored in the storage area 22b are the data items A11 and A13 from the item storing management table 27.

The item group record storing control means 31 gets the data items A11 and A13 from the user working area 33, and gets the identification data "1" and "3" from the item storing management table 27. Thus, an data item group record 38a-2 for the data items A11 and A13 is composed and written in the storage area 22b. The address of the item group record 38a-1 is stored in the area 381 of the item group record 38a-2 as an immediately lower order record address information.

Lastly, the data item A12 and the item identification data "2" are obtained. Thus, an item group record 38a-3 is composed and stored in the storage area 22a.

Operation for reading data will be described hereinafter. When the program 10a commands the reading of a record, the item group record read-in control means 32 reads the highest item group record 38a from the storage area 22a. When the item read-in command 24 is given, it is determined whether the instructed data item is already read or not from the item read-in display 29. When the instructed data item is not yet read in, the item group record including the instructed data item is read in from a storage area. For example, in the case that the instructed data item is the data item A13 of FIG. 15, the item group record 38a-2 is read. If the item group record 38a-3 is stored in the storage area 22a, the reading is carried out from the item group record 38a-3 which is the highest order to the item group record 38a-2. The read in data item (A13) is transmitted to a relative address of the user working area 33 based on the data item storing management table 27. Furthermore, a section of the item read-in display 29 corresponding to the data item is turned on, and the item group record control information is held in the control information retaining area 30.

Figure 12:
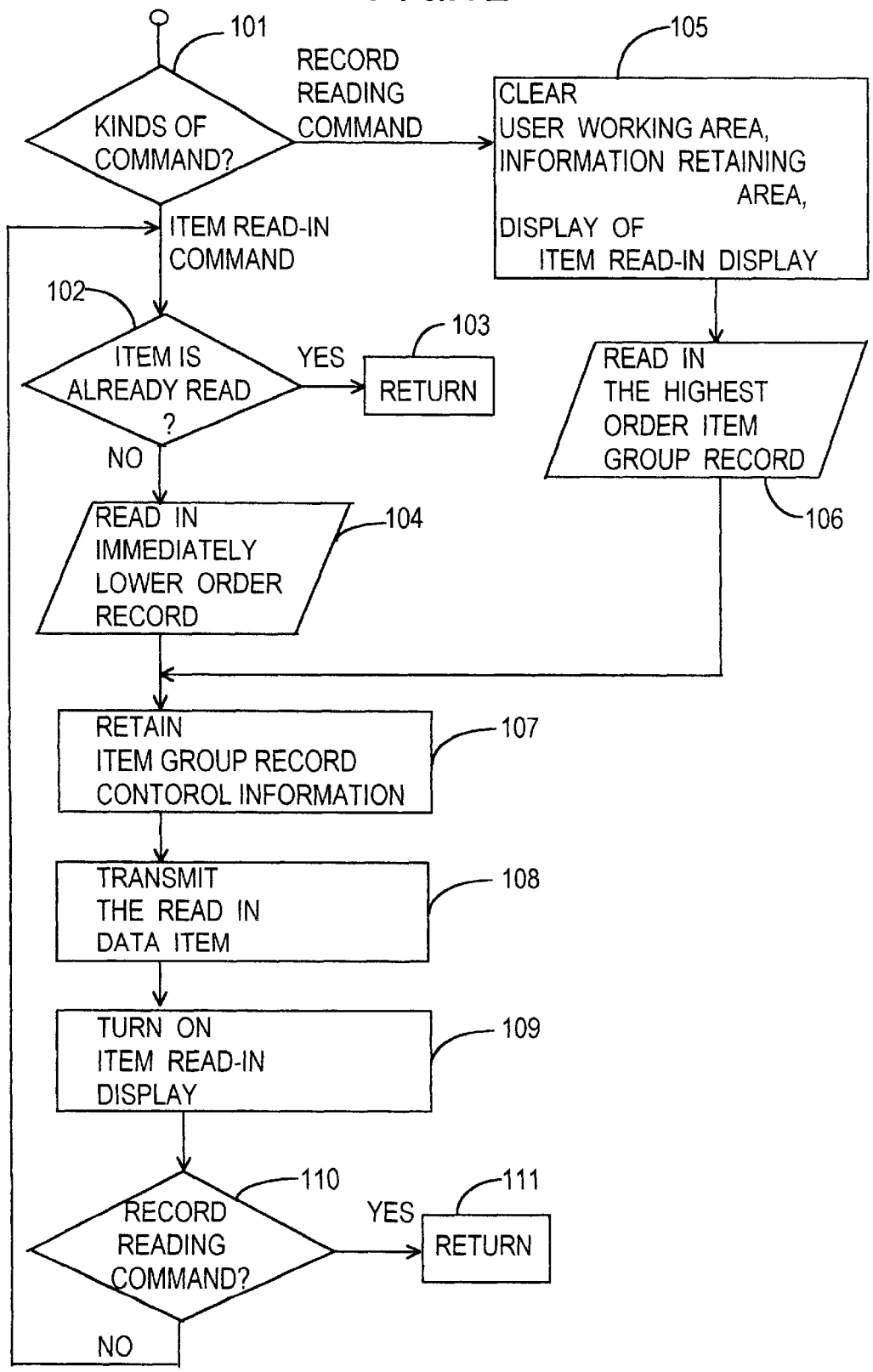
FIG. 12 is a flowchart of the reading process.

FIG. 12 is a flowchart of the above described reading process.

At a step 101, it is determined whether the command from the program is the record read-in command or the item read-in command. In case of the item reading command, it is determined whether the designated item is already read in or not (step 102). If yes, the program returns (step 103). If not, the immediately lower order record in unread records is read in (step 104), and the program proceeds to a step 107.

When the command is the record reading command at the step 101, the user working area 33, control information retaining area 30, and the display of item read-in display 29 are cleared (step 105), and the highest order item group record is read in (step 106), and the program proceeds to the step 107.

At the step 107, the item group record control information is stored in the control information retaining area 30. The read in data item is transmitted to the user working area 33 (step 108), thereafter a corresponding section of the item read-in display is turned on (step 109). Then, it is determined whether the command is the record reading command (step 110). If it is the case, the program is returned (step 111). If not, the program returns to the step 102, and the process is repeated.

Figure 13A:
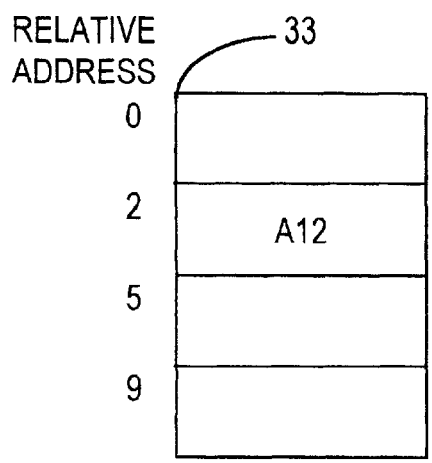
FIGS. 13a, 13b and 13c show states of a user working area, a display and a control information retaining area when a record reading command is given.
Figure 13B:
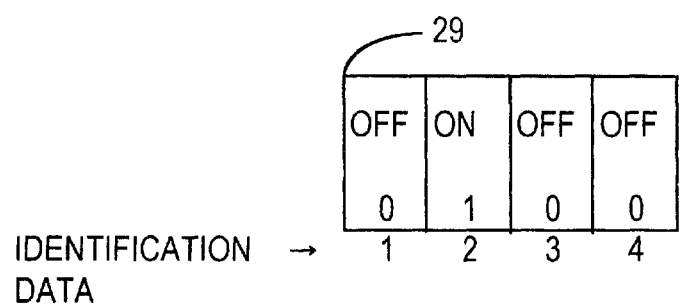
Figure 13C:
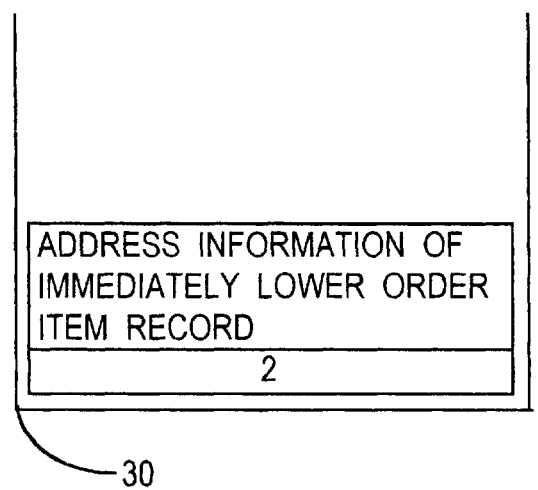
Figure 14A:
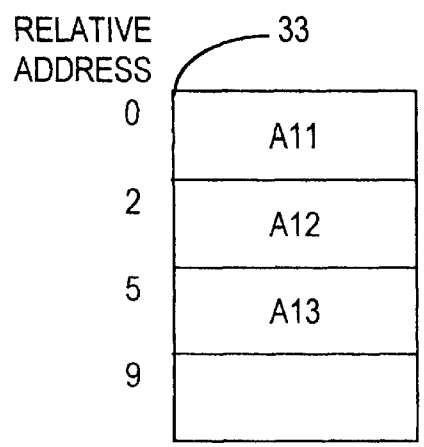
FIGS. 14a, 14b and 14c show states of a user working area, a display and a control information retaining area when an item read-in command of identification data of "3" is given.
Figure 14B:
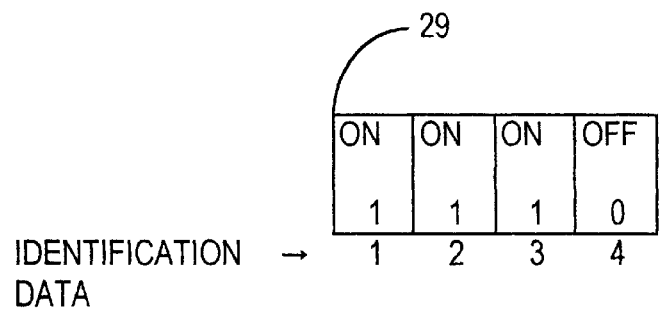
Figure 14C:
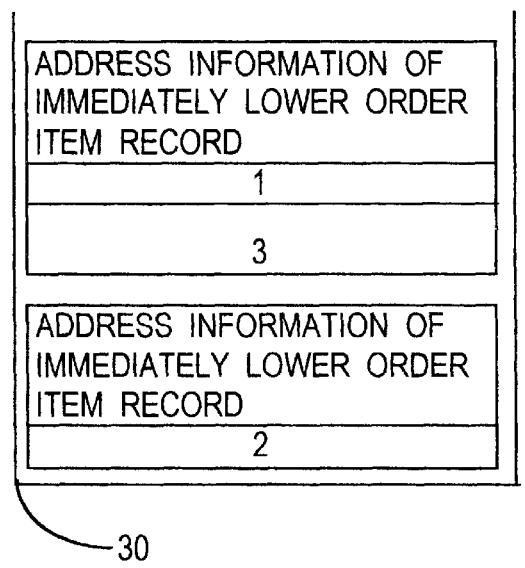

FIGS. 13a to 13c show states of areas 33 and 30, and display 29 when the command is reading command. FIGS. 14a to 14c show those states at the item read-in command to read the data item A13.

When the command to rewrite the record is given, the item group record storing control means 31 derives necessary data items from the user working area 33 based on the item group record control information held in control information retaining area 30, and the item storing management table 27, thereby composing the item group record 38a. The item group record 38a is returned to the address before the reading.

Figure 16:
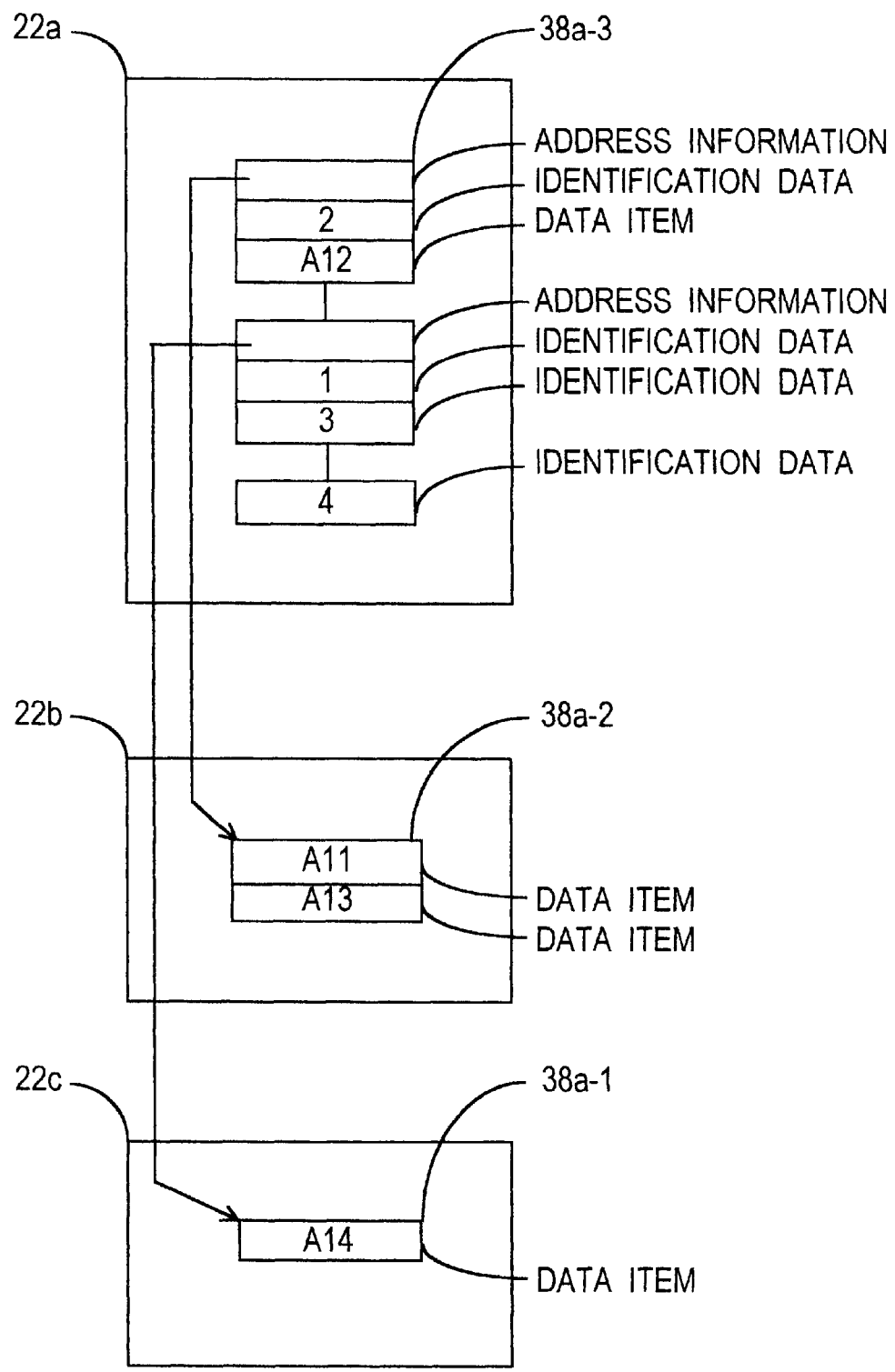
FIG. 16 shows a state that the item group record control information is stored in the upper storage area.

In the above described data storing control system, in order to obtain the data item A14 in FIG. 15, there is necessary three accesses to the storage areas 22a, 22b and 22c. As another storing system, a storing system of FIG. 16 may be provided. In the system, the item group record control information for the item group records in the storage areas 22b and 22c is stored in the upper storage area 22a. In the case, although necessary obtaining quantity of the storage area 22a increases, the access to the storage 22b is not necessary so that the access time for getting the data item A14 is shortened.

Furthermore, in the case that there is a plurality of item group records stored in the storage area 22b of FIG. 15, and that all of the records are necessary, the item group records can directly be read in sequence. In this case, it is not necessary to read item group record in the highest order storage area 22a, thereby shortening the access time.

In the case that, in spite of necessity of a data item in a record, the program 1Oa has not the item read-in command 24, the item read-in command producing means 26 in the compile program 25 produces the item read-in command 24.

The operation for relocating an item group record to a storage area different from the previous storage area is hereinafter described, in the case to relocate the item group record 38a-2 of FIG. 15 to the storage area 22a. The item group relocation means 34 reads the item group record 38a-2 from the storage area 22b and writes the read out item group record 38a-2 in the storage area 22a. FIG. 17 shows a storing state after the relocation. The relocation of the item group record 38a-2 means that the use frequency of the record increases.

FIG. 18 shows an example of the item group record relocation reference table 36. The reference table 36 provides the name 36a of a storage area in which an item group record necessary for relocation (in this case, the item group record 38a-2) is stored, an upper limit 36b of the number of access times to the item group record in one day, and the name 36c of a storage area in which the item group record should be relocated.

Operation for automatically relocating the item group record 38a-2 is described hereinafter. In the record use history area 383 (FIG. 10) for the item group record 38a-2, the number of access times accessing to the item group record 38a-2 in one day (frequency in use of the record in one day) is held as the item group record use history 383a. More specifically, the item group record use history updating means 35 adds 1 to the number of access times in one day in the item group record use history area 383 at every using of the item group record 38a-2 in the area 383, thereby rewriting the item group record 38a including the use history 383a. Furthermore, the item record use history updating means 35 informs the item group record relocation determining means 37 about the number of access times. The item group record relocation determining means 37 compares the number of access times in one day with the upper limit 36b of the number of access times in one day. When the number of access times of the item group record 38a-2 exceeds the upper limit 36b, the item group record relocation determining means 37 instructs the item group record relocation means 34 to relocate the item group record 38a-2. Thus, the item group record 38a-2 is relocated to the storage area 22a. Accordingly, in the storage area 22a, only records each having a high frequency in use in one day are stored.

In accordance with the present invention, the access time is shortened.

While the invention has been described in conjunction with preferred specific embodiment thereof, it will be understood that this description is intended to illustrate and not limit the scope of the invention, which is defined by the following claims.

What is claimed is:

1. A system for controlling storing and reading a record, comprising;

a plurality of first storage areas;

a record storing reference table having a record identification data storing area for identifying records and a storage area designation data storing area in which a storage area proper for a record to be newly stored is designated in accordance with characteristics of the record;

a second storage area for storing a storing-logic record;

storing control means for newly storing a record in one of the first storage areas designated by the record storing reference table, and for obtaining address information of the stored record, and for writing the address information in the second storage area as a storing-logic-record;

reading control means for reading a record stored in one of the first storage areas in accordance with the address information stored in the second storage area.

2. The system according to claim 1 further comprising record relocation means for relocating a designated record in a storage area different from a previously located storage area.

3. The system according to claim 2 further comprising a relocation reference table having a reference for determining relocation of records, record use history updating means for storing number of uses of record in one of the data storing areas as a use history, and for at every use of the record, record relocation determining means for determining relocation of a record based on the reference in the relocation reference table and the use history, the record relocation means being provided for relocating the record in accordance with determination of the record relocation determining means.

4. A system for controlling storing and reading a data item, comprising:

a plurality of storage areas;

a data item storing management table having a relative address, length, identification data of each of data items of each item group records, and name of a storage area in which a data item is to be newly stored;

a storage area access order table having the name of the storage area and data representing access order of the data item;

areas each of which is provided for composing one of the item group records;

storing control means for newly storing a data item in a storage area designated by the data item storing management table; and read-in control means for reading an unread data item in response to an item read-in command and for transmitting a read-in data item to a predetermined memory area.

5. The system according to claim 4 further comprising item group record relocation means for relocating a designated item group record in a storage area different from a previously located storage area.

6. The system according to claim 5 further comprising an item group record relocation reference table having a reference for determining relocation of item group records, item group record use history updating means for storing number of uses of item group record in one of the data storing areas as a use history, and for at every use of the item group record, item group record relocation determining means for determining relocation of an item group record based on the reference in the relocation reference table and the use history, the item group record relocation means being provided for relocating the item group record in accordance with determination of the item group record relocation determining means.

7. The system according to claim 1 wherein the second storage area is provided in one of the first storage areas.

* * * * *